(12) United States Patent  (10) Patent No.: US 10,572,449 B2
Subramaniam et al.  (45) Date of Patent: Feb. 25, 2020

(54) SYSTEMS, DEVICES, AND METHODS FOR SOFTWARE DISCOVERY USING APPLICATION ID TAGS

(71) Applicant: Walmart Apollo, LLC, Bentonville, AR (US)

(72) Inventors: Sreenevas Subramaniam, Bentonville, AR (US); David Stefferud, Fayetteville, AR (US); Kant Udornpim, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 469 days.

(21) Appl. No.: 15/056,320

(22) Filed: Feb. 29, 2016

(65) Prior Publication Data

US 2016/0259804 A1    Sep. 8, 2016

Related U.S. Application Data

(60) Provisional application No. 62/126,936, filed on Mar. 2, 2015.

(51) Int. Cl.
*G06F 16/00* (2019.01)
*G06F 16/16* (2019.01)

(52) U.S. Cl.
CPC .................. *G06F 16/168* (2019.01)

(58) Field of Classification Search
CPC .... G06F 8/60; G06F 17/301; G06F 17/30126; G06F 16/14; G06F 16/168; H04L 67/16; H04L 67/34
See application file for complete search history.

(56) References Cited

U.S. PATENT DOCUMENTS

| 6,108,712 A * | 8/2000 | Hayes, Jr. | G06F 9/44505 709/212 |
| 8,572,580 B2 * | 10/2013 | Sheehan | G06F 9/44536 717/121 |
| 9,148,460 B1 * | 9/2015 | Sun | H04L 63/0815 |
| 9,626,697 B2 * | 4/2017 | Rathus | G06Q 30/0259 |
| 2003/0050932 A1 * | 3/2003 | Pace | G06F 8/60 |
| 2003/0191775 A1 * | 10/2003 | Vaughan | G06F 8/61 |
| 2003/0220993 A1 * | 11/2003 | Blizniak | G06F 8/60 709/223 |
| 2005/0080801 A1 * | 4/2005 | Kothandaraman | H04L 67/06 |
| 2005/0160104 A1 * | 7/2005 | Meera | G06F 8/20 |

(Continued)

*Primary Examiner* — Leslie Wong
(74) *Attorney, Agent, or Firm* — McCarter & English, LLP; David R. Burns (57) ABSTRACT

Provided herein are methodologies, systems, and devices for facilitating software discovery within a server environment using an enterprise-specific application identifier tag file. Such enterprise-specific application identifier tag files can be created for applications from various vendors and can include enterprise-specific information not known to an application vendor. Once created, the enterprise-specific application identifier tag file is deployed within the server environment, and may be saved on a database associated with the server environment. The application identifier tag files can include a link to their corresponding application files and can facilitate in application/software discovery by allowing a user to determine application information by performing an enterprise-specific application identifier tag file query.

17 Claims, 6 Drawing Sheets

(56) References Cited

U.S. PATENT DOCUMENTS

| | | | |
|---|---|---|---|
| 2005/0171961 A1 | 8/2005 | Culbreth et al. | |
| 2009/0113397 A1* | 4/2009 | Wright, Sr. | G06F 21/552 |
| | | | 717/127 |
| 2009/0182727 A1* | 7/2009 | Majko | G06F 17/30554 |
| 2009/0276269 A1 | 11/2009 | Yee et al. | |
| 2011/0106835 A1* | 5/2011 | Lauridsen | G06F 17/3089 |
| | | | 707/769 |
| 2011/0202905 A1* | 8/2011 | Mahajan | G06F 8/43 |
| | | | 717/140 |
| 2012/0124072 A1 | 5/2012 | Vaidyanathan et al. | |
| 2012/0143931 A1* | 6/2012 | Rosenberger | G06F 17/301 |
| | | | 707/828 |
| 2012/0191646 A1* | 7/2012 | Faitelson | G06F 17/3012 |
| | | | 707/610 |
| 2013/0275574 A1* | 10/2013 | Hugard, IV | H04L 41/12 |
| | | | 709/224 |
| 2013/0282737 A1* | 10/2013 | Chen | H04L 67/02 |
| | | | 707/749 |
| 2014/0115609 A1 | 4/2014 | Chen | |
| 2014/0259190 A1* | 9/2014 | Kiang | G06F 21/6218 |
| | | | 726/30 |
| 2015/0277404 A1* | 10/2015 | Maturana | G06F 9/5072 |
| | | | 700/83 |
| 2015/0378702 A1* | 12/2015 | Govindaraju | G06F 8/61 |
| | | | 717/177 |
| 2016/0253349 A1* | 9/2016 | Greetham | G06F 16/13 |
| | | | 715/748 |
| 2016/0364771 A1* | 12/2016 | Nielsen | H04L 67/20 |
| 2017/0126741 A1* | 5/2017 | Lang | H04L 63/20 |

\* cited by examiner

SYSTEMS, DEVICES, AND METHODS FOR SOFTWARE DISCOVERY USING APPLICATION ID TAGS

RELATED APPLICATIONS

This application claims the benefit of and priority to U.S. Provisional Patent Application No. 62/126,936, filed Mar. 2, 2015, which is incorporated herein by reference in its entirety.

TECHNICAL FIELD

The present disclosure relates to techniques for discovering software within an enterprise environment including a network of servers distributed throughout the environment. The present disclosure also relates to methodologies, systems and devices for creating vendor agnostic software identifier tags for use in software discovery.

BACKGROUND OF THE TECHNOLOGY

In general, software discovery may be accomplished in a number of ways. Certain conventional software discovery techniques allow a user to discover applications from a particular vendor using its proprietary discovery tools, but do not provide a means for discovering software based on enterprise-specific information.

SUMMARY

Exemplary embodiments of the present disclosure provide systems, devices and methods that facilitate software discovery using enterprise-specific application identifier tag files that include enterprise information related to application files. The enterprise-specific application identifier tag files can be created, for example, via a graphical user interface (GUI) and can include unique enterprise-specific information typically not known to outside vendors.

In accordance with exemplary embodiments, a method of facilitating discovery of applications deployed within a server environment is disclosed. The method includes interacting with a user device to facilitate rendering a graphical user interface. The method also includes receiving user input via the graphical user interface identifying enterprise information related to a deployment of an application file within a server environment. The enterprise information includes at least one of: an enterprise-specific server location at which the application file resides within the server environment, an entity within the enterprise responsible for maintenance of the application file, or an entity within the enterprise responsible for maintenance of the server on which the application file is executed. The method also includes creating an enterprise-specific application identifier tag file that includes the enterprise information. The method further includes creating an association between the enterprise-specific application identifier tag file and the application file to facilitate discovery of the application file in the server environment, and to facilitate identification of the enterprise-specific server location at which the application file resides, the entity within the enterprise responsible for maintenance of the application file, or the entity within the enterprise responsible for maintenance of the server on which the application file is executed. The enterprise-specific application identifier tag file is stored in a database associated with the server environment.

In some embodiments, the method also includes deploying the enterprise-specific application identifier tag file within a server of the server environment contemporaneously with deployment of the application file within the server environment. In some embodiments, the enterprise-specific application identifier tag file has a unique filename extension. In some embodiments, the method also includes creating a soft link between the enterprise-specific application identifier tag file and the application file. In some embodiments, the enterprise-specific application identifier tag file is an XML-format file. In some embodiments, the method also includes creating an application identifier tag query to search for the enterprise-specific application identifier tag file within the server environment, and identifying the enterprise information related to the application file based on the application identifier tag query. In some embodiments, the application identifier tag query is generated automatically. In some embodiments, the enterprise-specific application identifier tag file has a unique filename extension, and the application identifier tag query is a filename extension query. In some embodiments, the application identifier tag query discovers a plurality of enterprise-specific application identifier tag files associated with a plurality of application files from a plurality of vendors, the plurality of application files having disparate, developer-specific identifiers provided by the vendors which are incompatible with each other. In some embodiments, the method also includes creating a query report including a list of enterprise-specific application identifier tag files created by a user. In some embodiments, the method also includes creating a query report including a list of enterprise-specific application identifier tag files relating to a specific support group within the enterprise. In some embodiments, the method also includes deleting the enterprise-specific application identifier tag file automatically in response to the application file being deleted from the server environment. In some embodiments, the application file is associated with a developer-specific identifier provided by a developer of the application file. The developer specific identifier can include application-specific information, and the enterprise-specific application identifier tag file can be distinct and separate from the developer specific identifier. In some embodiments, the method also includes creating a list of enterprise-specific application identifier tag files generated or deployed within the server environment. In some embodiments, the list of enterprise-specific application identifier tag files is stored in a database associated with the server environment. In some embodiments, the method also includes creating a history of enterprise-specific application identifier tag files generated within the server environment.

In accordance with exemplary embodiments, a system for facilitating discovery of applications deployed on servers is disclosed. The system includes a server of a server environment programmed to interact with a user device to facilitate rendering a graphical user interface. The server is also programmed to receive user input via the graphical user interface identifying enterprise information related to a deployment of an application file within the server environment. The enterprise information includes at least one of: an enterprise-specific server location at which the application file resides within the server environment, an entity within the enterprise responsible for maintenance of the application file, or an entity within the enterprise responsible for maintenance of the server on which the application file is executed. The server is also programmed to create an enterprise-specific application identifier tag file that includes the enterprise information. The server is also programmed to create an association between the enterprise-specific application identifier tag file and the application file to facilitate discovery of the application file within the server environment, and to facilitate identification of the enterprise-specific server location at which the application file resides, the entity within the enterprise responsible for maintenance of the application file, or the entity within the enterprise responsible for maintenance of the server on which the application file is executed. The enterprise-specific application identifier tag file is stored within a database associated with the server environment.

In some embodiments, the server is also programmed to deploy the enterprise-specific application identifier tag file within a server of the server environment contemporaneously with deployment of the application file within the server environment. In some embodiments, the enterprise-specific application identifier tag file has a unique filename extension. In some embodiments, the server is also programmed to create a soft link between the enterprise-specific application identifier tag file and the application file. In some embodiments, the enterprise-specific application identifier tag file is an XML-format file. In some embodiments, the server is also programmed to create an application identifier tag query to search for the enterprise-specific application identifier tag file within the server environment, and identify the enterprise information related to the application file based on the application identifier tag query. In some embodiments, the application identifier tag query is generated automatically. In some embodiments, the enterprise-specific application identifier tag file has a unique filename extension, and the application identifier tag query is a filename extension query. In some embodiments, the application identifier tag query discovers a plurality of enterprise-specific application identifier tag files associated with a plurality of application files from a plurality of vendors, the plurality of application files having disparate, developer-specific identifiers provided by the vendors which are incompatible with each other. In some embodiments, the server is also programmed to create a query report including a list of enterprise-specific application identifier tag files created by a user. In some embodiments, the server is also programmed to create a query report including a list of enterprise-specific application identifier tag files relating to a specific support group within the enterprise. In some embodiments, the server is also programmed to delete the enterprise-specific application identifier tag file automatically in response to the application file being deleted from the server environment. In some embodiments, the application file is associated with a developer-specific identifier provided by a developer of the application file. The developer specific identifier can include application-specific information, and the enterprise-specific application identifier tag file can be distinct and separate from the developer specific identifier. In some embodiments, the server is also programmed to create a list of enterprise-specific application identifier tag files generated or deployed within the server environment. In some embodiments, the list of enterprise-specific application identifier tag files is stored in a database associated with the server environment. In some embodiments, the server is also programmed to create a history of enterprise-specific application identifier tag files generated within the server environment.

In accordance with exemplary embodiments, a non-transitory computer readable medium storing instructions executable by a processing device, is disclosed, wherein execution of the instructions causes the processing device to implement a method of facilitating discovery of applications deployed on servers in a server environment. The method implemented upon execution of the instructions by the processing device includes interacting with a user device to facilitate rendering a graphical user interface. The method implemented upon execution of the instructions by the processing device also includes receiving user input via the graphical user interface identifying enterprise information related to a deployment of an application file within a server environment. The enterprise information includes at least one of: an enterprise-specific server location at which the application file resides within the server environment, an entity within the enterprise responsible for maintenance of the application file, or an entity within the enterprise responsible for maintenance of the server on which the application file is executed. The method implemented upon execution of the instructions by the processing device further includes creating an enterprise-specific application identifier tag file that includes the enterprise information. The method implemented upon execution of the instructions by the processing device also includes creating an association between the enterprise-specific application identifier tag file and the application file to facilitate discovery of the application file within the server environment, and to facilitate identification of the enterprise-specific server location at which the application file resides, the entity within the enterprise responsible for maintenance of the application file, or the entity within the enterprise responsible for maintenance of the server on which the application file is executed. The enterprise-specific application identifier tag file is stored in a database associated with the server environment.

In some embodiments, the execution of the instructions stored on the non-transitory computer readable medium causes the processing device to deploy the enterprise-specific application identifier tag file within a server of the server environment contemporaneously with deployment of the application file within the server environment. In some embodiments, the enterprise-specific application identifier tag file has a unique filename extension. In some embodiments, the execution of the instructions causes the processing device to create a soft link between the enterprise-specific application identifier tag file and the application file. In some embodiments, the enterprise-specific application identifier tag file is an XML-format file. In some embodiments, the execution of the instructions also causes the processing device to create an application identifier tag query to search for the enterprise-specific application identifier tag file within the server environment, and to identify the enterprise information related to the application file based on the application identifier tag query. In some embodiments, the application identifier tag query is generated automatically. In some embodiments, the enterprise-specific application identifier tag file has a unique filename extension, and the application identifier tag query is a filename extension query. In some embodiments, the application identifier tag query discovers a plurality of enterprise-specific application identifier tag files associated with a plurality of application files from a plurality of vendors, and each of the plurality of application files has disparate, developer-specific identifiers provided by the vendors which are incompatible with each other. In some embodiments, the execution of the instructions causes the processing device to create a query report including a list of enterprise-specific application identifier tag files created by a user. In some embodiments, the execution of the instructions causes the processing device to create a query report including a list of enterprise-specific application identifier tag files relating to a specific support group within the enterprise. In some embodiments, the execution of the instructions causes the processing device to delete the enterprise-specific application identifier tag file automatically in response to the application file being deleted from the server environment. In some embodiments, the application file is associated with a developer-specific identifier provided by a developer of the application file. The developer specific identifier can include application-specific information, and the enterprise-specific application identifier tag file can be distinct and separate from the developer specific identifier. In some embodiments, the execution of the instructions causes the processing device to create a list of enterprise-specific application identifier tag files generated or deployed within the server environment. In some embodiments, the list of enterprise-specific application identifier tag files is stored in a database associated with the server environment. In some embodiments, the execution of the instructions causes the processing device to create a history of enterprise-specific application identifier tag files generated within the server environment.

Any combination or permutation of embodiments is envisioned.

BRIEF DESCRIPTION OF THE DRAWINGS

The foregoing and other features and advantages provided by the present disclosure will be more fully understood from the following description of exemplary embodiments when read together with the accompanying drawings, in which.

DETAILED DESCRIPTION

I. General Overview

Provided herein are methodologies, systems, apparatus, and non-transitory computer-readable media for facilitating discovery of applications or software deployed on servers within a server environment.

According to conventional methodologies, a software discovery tool may be used to discover software installed on servers by searching for a hashcode, or other similar code or application fingerprint, associated with the application. However, hashcodes or application fingerprints will be different depending on the operating system on which an application is installed, and are specific to the developer/ vendor that generated the software (i.e. they will not include any enterprise-specific information). Therefore, using such conventional discovery techniques, it is generally not possible to discover, via these hashcodes or application fingerprints, multiple instances of an application installed on different operating systems or discover applications based on enterprise-specific information. Furthermore, discovery of software based on the hashcodes or application fingerprints often yields insufficient information about a specific relationship of the software to the enterprise environment within which the software is deployed; thereby requiring additional steps and/or processes to discover or identify such relationships, which leads to inefficient use of both user and computer resources.

In exemplary embodiments, in addition to containing information related to a specific application and/or vendor, an enterprise-specific application identifier tag includes critical enterprise information related to the applications and allows a user to discover applications based on this enterprise information and/or to utilize the enterprise-specific information upon discovery of the applications to perform one or more tasks or actions that would otherwise be precluded absent the enterprise information. This enterprise information may include, for example, a server location at which the application file resides within an enterprise server environment, an entity within the enterprise responsible for maintenance of the application file, an entity within the enterprise responsible for maintenance of the server on which the application file is executed, an internal team name associated with the application file, an outlook group or team name associated with the application file, a country in which an application is deployed, and/or an email distribution list associated with the application file. This information allows a user to identify enterprise critical information, such as which businesses are being affected by the application, or an error in the application. Such enterprise-specific information may be input, for example, using a GUI on an electronic device during the enterprise-specific application identifier tag generation process. Once the enterprise-specific information is received, the enterprise-specific application identifier tag is created and may be deployed within the server environment. In exemplary embodiments, an enterprise-specific application identifier tag file may be discovered using a discovery tool, or enterprise-specific application identifier tag query, and information related to a corresponding application file may be identified based on the query results. When the enterprise-specific application identifier tag file is discovered, there is a relationship identified between the tag file (and therefore its corresponding application file) and the server, i.e. between a software instance of the application and a hardware upon which the instance of the application is executed.

For example, an application may be installed on 1,000 server locations within an enterprise's server environment and may be associated with a logistics team and a specific business sector within an enterprise. In such an example, a discovery tool may advantageously discover this application by searching for applications associated with the specific business sector or the logistics team. Alternatively, a discovery query based on an application name or type will advantageously provide the business sector, team, server locations, etc. associated with that application. In exemplary embodiments, the enterprise-specific application identifier tag can be deployed with an application and/or discovered via a discovery tool regardless of the application vendor or the operating system on which the application is installed. By generating and deploying enterprise-specific application identifier tags along with corresponding software applications in the server environment, exemplary embodiments can advantageously reduce a number of steps and/or processes required to discover or identify relationships between the software applications and the enterprise environment, which can result in improvements to the processes and functions of the computing devices in the enterprise environment and can reduce the computing resources required during the software discovery process.

Exemplary embodiments are described below with reference to the drawings. One of ordinary skill in the art will recognize that exemplary embodiments are not limited to the illustrative embodiments, and that components of exemplary systems, devices and methods are not limited to the illustrative embodiments described below.

II. Exemplary Inventory Identification Operations

Exemplary systems, devices, methods, and non-transitory computer-readable media can be used to define and execute one or more application discovery operations in which an enterprise-specific application identifier tag file is created via a GUI. Once created, an association may be made between the enterprise-specific application identifier tag file and an application file.

Figure 1:
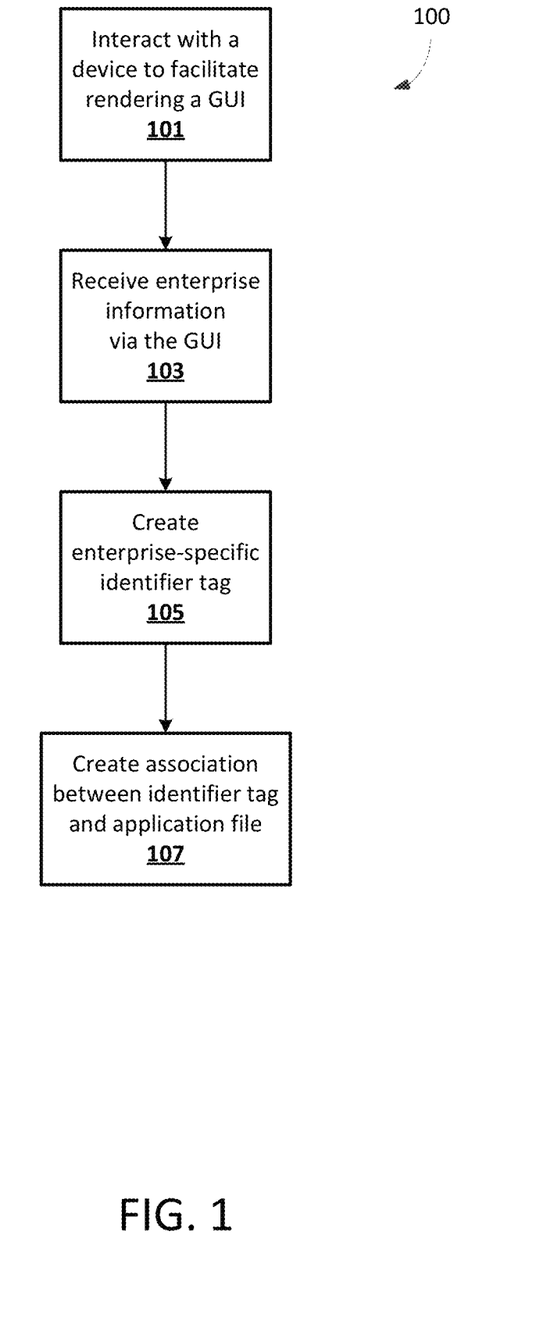
FIG. 1 is a flowchart illustrating an exemplary method of facilitating discovery of applications, according to embodiments of the present disclosure.

FIG. 1 is a flowchart that illustrates an exemplary method 100 for facilitating discovery of applications within a server environment by receiving, via a GUI, enterprise information, creating an enterprise-specific application identifier tag file, and creating an association between the enterprise-specific application identifier tag file and a corresponding application file.

In step 101, a server of a server environment interacts with a user device in order to render a GUI on the user device. In exemplary embodiments, a user of the user device can interact with the GUI via a touch-screen UI, or any other suitable UI, such as a keyboard or microphone, for inputting information that will be included in the enterprise-specific application identifier tag file. The server may be local or remote to the user device, and the interaction may take place over a wired or wireless network, in various embodiments.

In step 103, user input is received via the GUI which identifies enterprise information related to the deployment of an application file within the server environment. In exemplary embodiments, the enterprise-specific information may include an enterprise-specific server location where the application file resides (or will reside) within the server environment, an entity or entities within the enterprise responsible for the maintenance of the application file, an entity or entities within the enterprise responsible for maintenance of the server on which the application file is executed, and/or any other suitable enterprise-specific information. An exemplary GUI can be programmed to receive enterprise information in an electronic format via manual entry, selection of options from a drop-down menu, or any other suitable user input technique. In some embodiments, in addition to enterprise-specific information, the GUI may also be programmed to receive application specific information such as application name, application type, application version number, etc.

In step 105, an enterprise-specific application identifier tag file is created that includes the enterprise information received above in step 103. In exemplary embodiments, the enterprise-specific application identifier tag file can be created by a tag generator within the server environment, and can have a unique filename extension, such as ".swidtag", ".appidtag", or any other suitable filename extension that distinguishes the application identifier tag file from other files that can be generated within the sever environment. This unique filename extension may simplify the software discovery process, allowing a user to search for enterprise-specific application identifier tag files by searching for the unique filename extension. In some embodiments, the enterprise-specific application identifier tag file can be generated using an XML-format file.

In step 107, an association is created between the enterprise-specific application identifier tag file and its corresponding application file. In some embodiments, this association may include a symbolic link, or soft link, that includes a reference to the file or directory location of the corresponding application file. The creation of a soft link may allow the enterprise-specific application identifier tag file to be stored anywhere within the server environment, not necessarily in the same storage location as its corresponding application file. For example, the enterprise-specific application identifier tag file can be stored in a different directory, database or repository, server (e.g., in a different geographic location), and/or in any suitable storage location. In some embodiments, the enterprise-specific application identifier tag and the corresponding application file can be stored in the same directory, database or repository, server (e.g., in a different geographic location). In some embodiment, the soft link can be automatically interpreted by a discovery tool being executed by a computing device in the server environment (e.g., a server) to follow a path identified in the soft link to the corresponding application file.

The association between the enterprise-specific application identifier tag file and the application file facilitates discovery of the application file, as well as identification of the enterprise-specific server location at which the application file resides, the entity within the enterprise responsible for the maintenance of the server on which the application file is executed, or the enterprise-specific application identifier tag file being stored in a database associated with the server environment. The association also allows a user to search for the enterprise-specific application identifier tag file and retrieve application information from that file without the need to discover the actual application file itself. The association between the enterprise-specific application identifier tag file and the application file may be created, in some embodiments, by deploying the enterprise-specific application identifier tag file contemporaneously with the installation of the application file within the server environment. A list of enterprise-specific application identifier tag files that have been generated and/or deployed within the server environment, may be created and stored in a database associated with the server environment. In some cases a database may store a history of enterprise-specific application identifier tag files that have been generated and/or deployed within the server environment.

The application file, in some embodiments, may also be associated with a developer-specific identifier provided by the developer of the application file. This developer-specific identifier is distinct and separate from the enterprise-specific application identifier tag file. In contrast to the developer-specific identifier, the enterprise-specific application identifier tag file includes enterprise information that would not typically be known to an application developer. In exemplary embodiments, an enterprise-specific application identifier tag file may be automatically deleted from the server environment when its corresponding application file is deleted from the server environment. In other exemplary embodiments, the association between the enterprise-specific application identifier tag file can be automatically updated if the location of the application is moved. The enterprise-specific application identifier tag file can be packaged with a new application and the location of tag file does not affect the software discovery process. Also if a development team decides to use a generic location like /usr/ share/swidtags (in unix) or c:\swidtags (in windows), an upgrade or location change on an application file can overwrite the existing tags.

Figure 2:
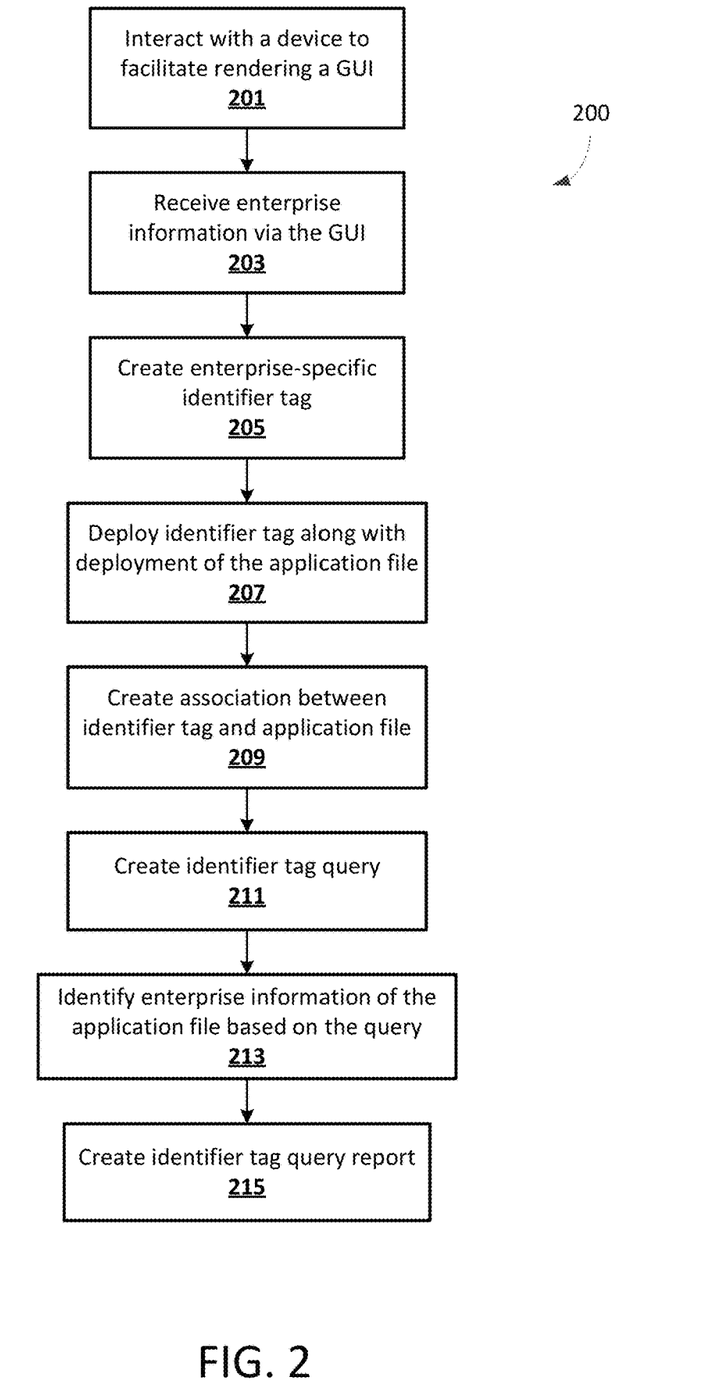
FIG. 2 is a flowchart illustrating another exemplary method of facilitating discovery of applications, according to embodiments of the present disclosure.

FIG. 2 is a flowchart that illustrates an exemplary method 200 for facilitating discovery of applications within a server environment by receiving, via a GUI, enterprise information, creating an enterprise-specific application identifier tag file, deploying the enterprise-specific application identifier tag file within the server environment, creating an association between the enterprise-specific application identifier tag file and a corresponding application file, and creating an enterprise-specific application identifier tag file query.

In step 201, a server of a server environment interacts with a user device in order to render a GUI on the device. In exemplary embodiments, a user can interact with the GUI via a touch-screen UI of the user device, or any other suitable UI, such as a keyboard or microphone, for inputting information that will be included in the enterprise-specific application identifier tag file. The server may be local or remote to the user device, and the interaction may take place over a wired or wireless network, in various embodiments.

In step 203, user input is received via the GUI which identifies enterprise information related to the deployment of an application file within the server environment. In exemplary embodiments, the enterprise-specific information may include an enterprise-specific server location where the application file resides (or will reside) within the server environment, an entity or entities within the enterprise responsible for the maintenance of the application file, an entity or entities within the enterprise responsible for maintenance of the server on which the application file is executed, and/or any other suitable enterprise-specific information. An exemplary GUI can be programmed to receive enterprise information in an electronic format via manual entry, selection of options from a drop-down menu, or any other suitable user input technique. In some embodiments, in addition to enterprise-specific information, the GUI may also be programmed to receive application specific information such as application name, application type, application version number, etc.

In step 205, an enterprise-specific application identifier tag file is created that includes the enterprise information received above in step 203. In exemplary embodiments, the enterprise-specific application identifier tag file can be created by a tag generator within the server environment, and can have a unique filename extension, such as ".swidtag", ".appidtag", or any other suitable filename extension that distinguishes the application identifier tag file from other files that can be generated within the sever environment. This unique filename extension may simplify the software discovery process, allowing a user to search for enterprise-specific application identifier tag files by searching for the unique filename extension. In some embodiments, the enterprise-specific application identifier tag file can be generated using an XML-format file.

In step 207, the enterprise-specific application identifier tag file is deployed within the server environment contemporaneously with the installation of the application file within the server environment. In exemplary embodiments, when an application file is deployed within a server environment, a user may be prompted to create and deploy an enterprise-specific application identifier tag file. In some embodiments, for example, the user may be prompted via the exemplary user interfaces described below in reference to FIGS. 3A and 3B.

In step 209, an association is created between the enterprise-specific application identifier tag file and its corresponding application file. In some embodiments, this association may include a symbolic link, or soft link, that includes a reference to the file or directory location of the application file. The creation of a soft link may allow the enterprise-specific application identifier tag file to be stored anywhere within the server environment, not necessarily in the same storage location as its corresponding application file. For example, the enterprise-specific application identifier tag file can be stored in a different directory, database or repository, server (e.g., in a different geographic location), and/or in any suitable storage location. In some embodiments, the enterprise-specific application identifier tag and the corresponding application file can be stored in the same directory, database or repository, server (e.g., in a different geographic location). In some embodiments, the soft link can be automatically interpreted by a discovery tool being executed by a computing device in the server environment (e.g., a server) to follow a path identified in the soft link to the corresponding application file.

The association between the enterprise-specific application identifier tag file and the application file facilitates discovery of the application file, as well as identification of the enterprise-specific server location at which the application file resides, the entity within the enterprise responsible for the maintenance of the server on which the application file is executed, or the enterprise-specific application identifier tag file being stored in a database associated with the server environment. The association also allows a user to search for the enterprise-specific application identifier tag file and retrieve application information from that file without the need to discover the actual application file itself.

In step 211, an enterprise-specific application identifier tag file query is created. Such a query may include a query based on a unique filename extension associated with enterprise-specific application identifier tag files, the enterprise information included within the enterprise-specific application identifier tag files, and/or any other information associated with or included in the enterprise-specific application identifier tag files. In exemplary embodiments, the enterprise-specific application identifier tag file query is created by a discovery engine within the server environment. In some embodiments, an enterprise-specific application identifier tag file query is generated automatically as part of a routine discovery process. Such a query may discover a number of different enterprise-specific application identifier tag files associated with application files from various different vendors, each of which have disparate, developer-specific identifiers provided by their respective vendors that are incompatible with each other.

In step 213, enterprise information relating to an application file is identified in response to the query created in step 211. For example, a query may be created that searches for all files having a filename extension ".swidtag" and assigned to a specific team, department, or group within the enterprise. Such a query will produce all enterprise-specific application identifier tag files that are assigned to that enterprise-specific team, allowing a user to identify enterprise information relating to an application file, such as which application files are assigned to that team and/or where such application files are deployed within the server environment (e.g., the storage location and/or the physical location). In exemplary embodiments, a logistics development team can enable application development for all logistics and transportation applications within an enterprise. Accordingly, enterprise-specific application identifier tag files created by the logistics development team can be queried, and a report can be generated based on the date and time of the creation of tags by that team.

In step 215, an enterprise-specific application identifier tag file query report is created. In exemplary embodiments, the query report may include a list of enterprise-specific application identifier tag files created by a specific user, or a list of enterprise-specific application identifier tag files relating to a specific group within the enterprise, such as a project team or maintenance group. In other embodiments, the list of enterprise-specific application identifier tag files that have been generated and/or deployed within the server environment may be created and stored in a database associated with the server environment. In some cases a database may store a history of enterprise-specific application identifier tag files that have been generated and/or deployed within the server environment, or a history of query reports.

III. Exemplary Graphical User Interfaces

Figure 3A:
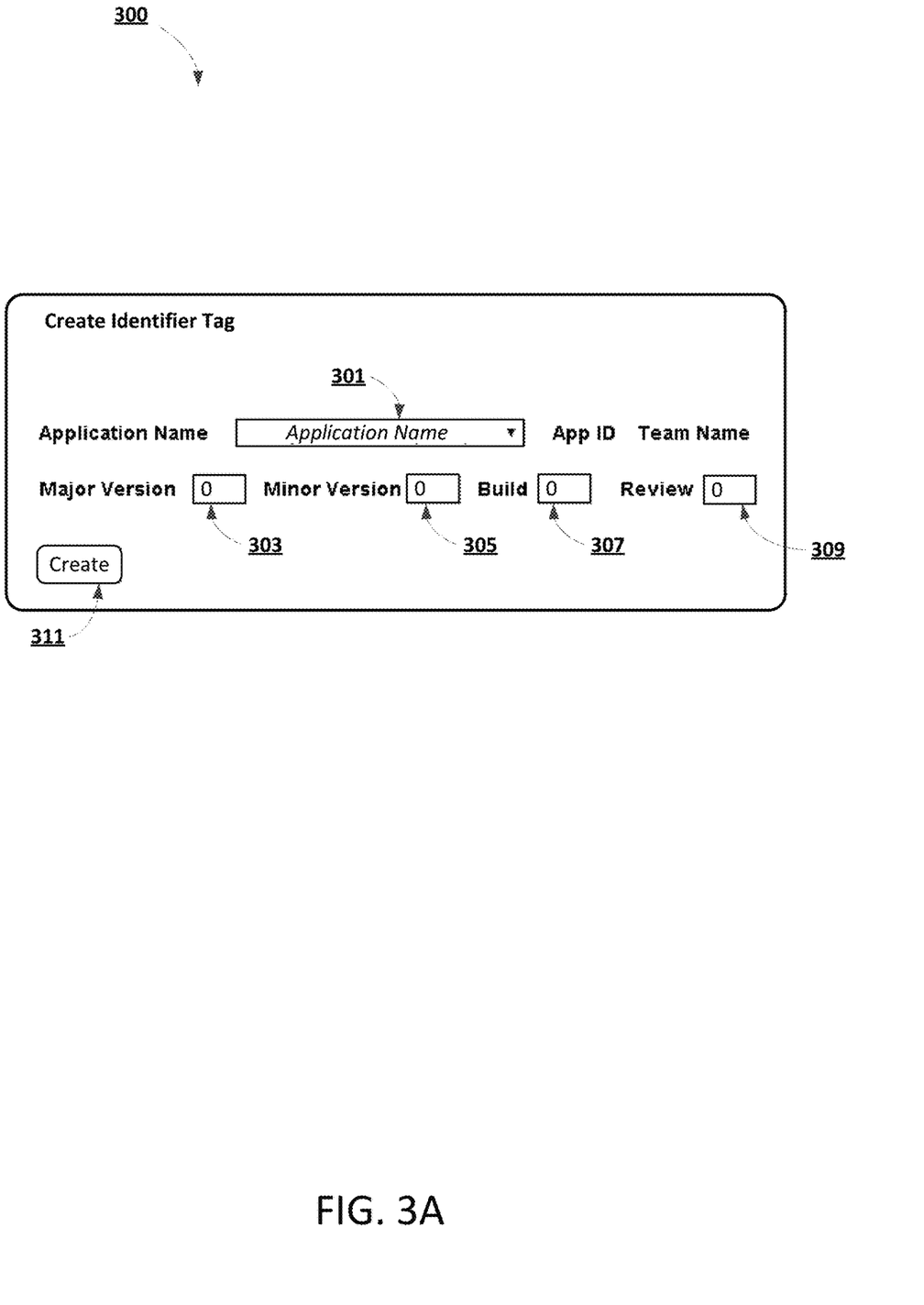
FIG. 3A depicts an exemplary graphical user interface for creating an enterprise-specific application identifier tag, according to embodiments of the present disclosure.

FIG. 3A depicts an example GUI 300 for receiving information for the creation of an enterprise-specific application identifier tag file, in accordance with exemplary embodiments of the present disclosure. In exemplary embodiments, a GUI 300 displays a window for creating an enterprise-specific application identifier tag file. In exemplary embodiments, the GUI allows a user to input the name 301 of the application file for which the enterprise-specific application identifier tag file is being created, the application major version 303, the application minor version 305, the application build number 307, the application review number 309, and/or any other suitable information about the application file and/or the enterprise. The various input fields 301, 303, 305, 307, and 309 may be populated manually using, for example, a touchscreen or physical keyboard, or by selecting an option from a drop-down menu. Once the information fields have been populated, a user may create the enterprise-specific application identifier tag file by selecting a control feature 311. In exemplary embodiments, the control feature 311 may be selectable via a mouse cursor, a touch-screen gesture, or any other suitable user input command.

Figure 3B:
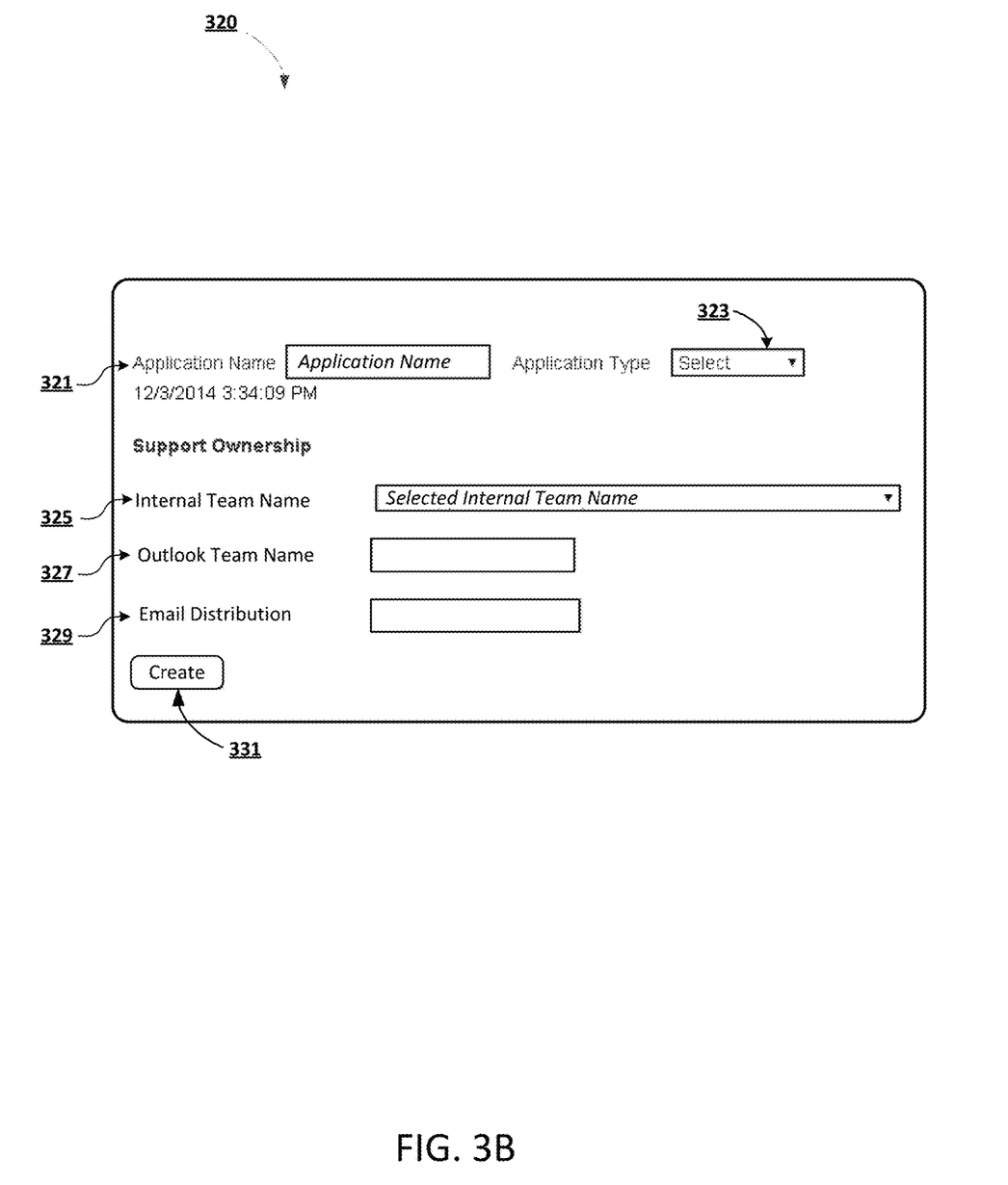
FIG. 3B depicts an exemplary graphical user interface for creating an enterprise-specific application identifier tag, according to embodiments of the present disclosure.

FIG. 3B depicts an example GUI 320 for receiving information for the creation of an enterprise-specific application identifier tag file, in accordance with exemplary embodiments of the present disclosure. In exemplary embodiments, a GUI 320 displays a window for submitting enterprise-specific information for the creation of an enterprise-specific application identifier tag file. In exemplary embodiments, the GUI 320 allows a user to input the name 321 of the application file corresponding to the enterprise-specific application identifier tag file being created, as well as the application type 323. In exemplary embodiments, the GUI 320 may optionally include a time-stamp identifying when the enterprise-specific application identifier tag is created and/or deployed within the server environment. The GUI 320 may also include input fields corresponding to additional enterprise-specific information, such as, an internal team name 325 associated with the application file, an outlook team name 327 associated with the application file, and/or an email distribution 329 that can identify entities that will receive notifications associated with the application file (e.g., trouble tickets). The various input fields associated with the application name, application type, internal team name, outlook team name, email distribution, etc. may be populated manually using, for example, a touchscreen or physical keyboard, or by selecting an option from a drop-down menu. Once the fields have been populated, a user may submit the enterprise-specific information by selecting a control feature 331. In exemplary embodiments, the control feature 331 may be selectable via a mouse cursor, a touch-screen gesture, or any other suitable user input command.

As will be appreciated, the exemplary user interfaces shown in FIGS. 3A-3B are presented merely as non-limiting examples of GUI and the manner in which relevant information may be received for creating and deploying an enterprise-specific application identifier tag file. Numerous other embodiments will be apparent in light of this disclosure. Other embodiments may, for example, include additional or fewer input fields, or automatically fill certain fields.

IV. Exemplary Network Environments

Figure 4:
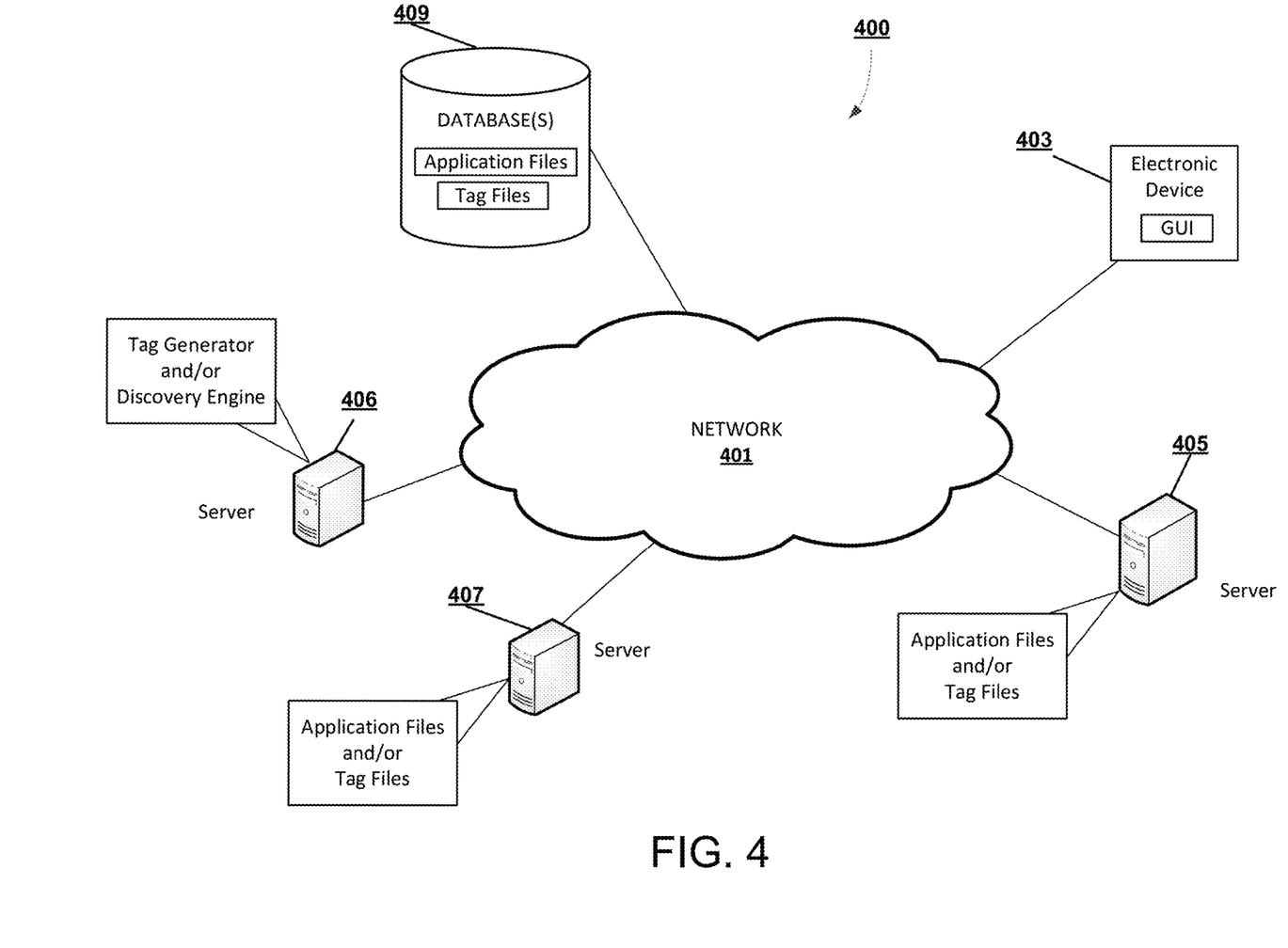
FIG. 4 is a block diagram of an exemplary computing device that can be used to perform exemplary processes in accordance with exemplary embodiments of the present disclosure.

FIG. 4 is a diagram of an exemplary network environment 400 suitable for a distributed implementation of exemplary embodiments. The network environment 400 can include one or more servers 405 and 407. As will be appreciated, various distributed or centralized configurations may be implemented, and in some embodiments a single server can be used. The network environment may also include a database 409, associated with servers 405, 406, and 407. In exemplary embodiments, the database 409 or one or more servers 405 and 407 can store the application files and/or enterprise-specific application identifier tag files, while server 406 can store a tag generator and/or discovery engine. The network environment may also include an electronic device 403, including a GUI that may be displayed to a user as described above in reference to FIGS. 3A and 3B. Once the GUI of the electronic display device 403 receives the requested enterprise information, that information may be transmitted to the servers 405 and 407 and/or database 409, and the enterprise-specific application identifier tag file may be created and deployed, as disclosed above.

In exemplary embodiments, the servers 405 and 407, database 409, and the electronic display device 403 may be in communication with each other via a communication network 401. The communication network 401 may include, but is not limited to, the Internet, an intranet, a LAN (Local Area Network), a WAN (Wide Area Network), a MAN (Metropolitan Area Network), a wireless network, an optical network, and the like. In exemplary embodiments, the electronic device 403 that is in communication with the servers 405 and 407 and database 409 can generate and transmit a database query requesting information from the raw data matrices or database 409. As described above in reference to FIG. 2, the database query may include a software discovery query, such as an enterprise-specific application identifier tag file query.

In exemplary embodiments, servers 405-406 can interact with the electronic device 403 and database 409 over communication network 401 to render a GUI on the electronic device 403. A user can then interact with the GUI and input application information, that can be stored within database 409. The application information can be used by the tag generator of server 406 to generate an enterprise-specific application identifier tag file, as disclosed above. The enterprise-specific application identifier tag file can then be deployed within the server environment and saved at one or more servers 405 and 407, or database 409. The application files corresponding to the enterprise-specific application identifier tag files can also be located at one or more servers 405 and 407, or at database 409, in various embodiments. In exemplary embodiments, the tag generator can also create an association between the enterprise-specific application identifier tag files and their corresponding application files. Once deployed within the server environment, the enterprise-specific application identifier tag files can be discovered via a discovery engine stored on server 406. In exemplary embodiments, the discovery engine can create an enterprise-specific application identifier tag file query, as discussed above in reference to FIG. 2. The discovery engine can also identify information relating to an application file based on the query and create a query report that includes the query results. This query report can be stored in the database 409, in some embodiments.

V. Exemplary Computing Devices

Figure 5:
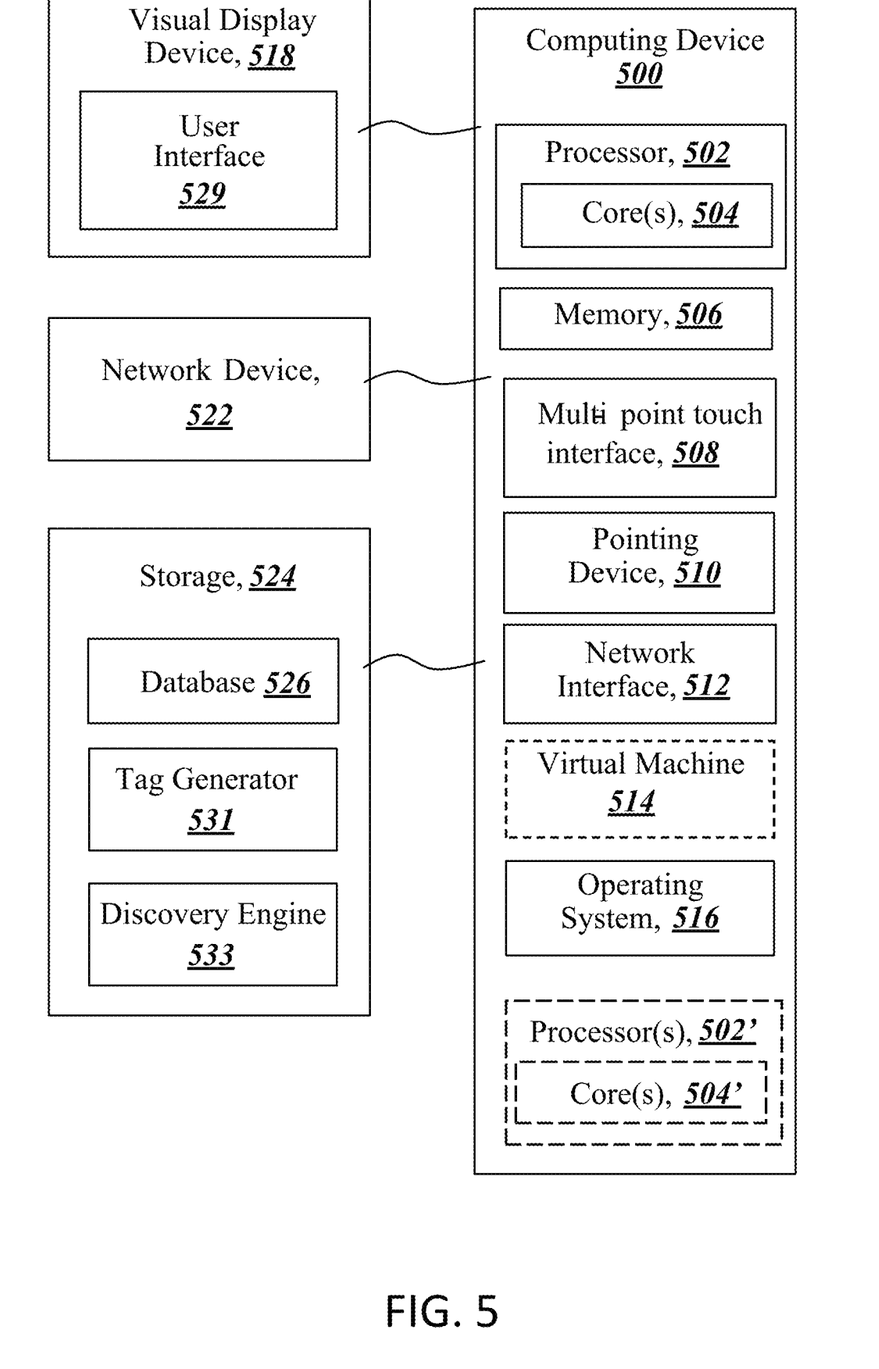
FIG. 5 is a diagram of an exemplary network environment suitable for a distributed implementation of exemplary embodiments of the present disclosure.

FIG. 5 is a block diagram of an exemplary computing device 500 that can be used to perform the methods provided by exemplary embodiments. The computing device 500 includes one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more USB flashdrives), and the like. For example, memory 506 included in the computing device 500 can store computer-readable and computer-executable instructions or software for implementing exemplary embodiments, such as a tag generator 531 and/or a discovery engine 533 programmed to perform processes described herein. The computing device 500 also includes processor 502 and associated core 504, and optionally, one or more additional processor(s) 402' and associated core(s) 504' (for example, in the case of computer systems having multiple processors/cores), for executing computer-readable and computer-executable instructions or software stored in the memory 506 and other programs for controlling system hardware. Processor 502 and processor(s) 502' can each be a single core processor or multiple core (504 and 504') processor.

Virtualization can be employed in the computing device 500 so that infrastructure and resources in the computing device can be shared dynamically. A virtual machine 514 can be provided to handle a process running on multiple processors so that the process appears to be using only one computing resource rather than multiple computing resources. Multiple virtual machines can also be used with one processor.

Memory 506 can be non-transitory computer-readable media including a computer system memory or random access memory, such as DRAM, SRAM, EDO RAM, and the like. Memory 506 can include other types of memory as well, or combinations thereof.

A user can interact with the computing device 500 through a visual display device 518, such as a touch screen display or computer monitor, which can display one or more user interfaces 529 that can be provided in accordance with exemplary embodiments, for example, the exemplary interfaces illustrated in FIGS. 3A-3B. The visual display device 518 can also display other aspects, elements and/or information or data associated with exemplary embodiments, for example, views of databases, maps, tables, graphs, charts, and the like. The computing device 300 can include other I/O devices for receiving input from a user, for example, a keyboard or any suitable multi-point touch interface 508, a pointing device 510 (e.g., a pen, stylus, mouse, or trackpad). The keyboard 508 and the pointing device 510 can be coupled to the visual display device 518. The computing device 500 can include other suitable conventional I/O peripherals.

The computing device 500 can also include one or more storage devices 524, such as a hard-drive, CD-ROM, or other non-transitory computer readable media, for storing data and computer-readable instructions and/or software, such the tag generator 531 and the discovery engine 533, which may generate user interfaces 529 that implement exemplary embodiments of the application discovery system as taught herein, or portions thereof. Exemplary storage device 524 can also store one or more databases for storing any suitable information required to implement exemplary embodiments. The databases can be updated by a user or automatically at any suitable time to add, delete or update one or more items in the databases. Exemplary storage device 524 can store one or more databases 526 for storing enterprise information, enterprise-specific application identifier tag files, application files, associations between enterprise-specific application identifier tag files and application files, enterprise-specific application identifier tag file queries, query reports, and any other data/information used to implement exemplary embodiments of the systems and methods described herein.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 512 can include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 can be any computer system, such as a workstation, desktop computer, server, laptop, handheld computer, tablet computer (e.g., the iPad® tablet computer), mobile computing or communication device (e.g., the iPhone® communication device), or other form of computing or telecommunications device that is capable of communication and that has sufficient processor power and memory capacity to perform the operations described herein.

The computing device 500 can run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In exemplary embodiments, the operating system 516 can be run in native mode or emulated mode. In an exemplary embodiment, the operating system 516 can be run on one or more cloud machine instances.

VI. Equivalents

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps can be replaced with a single element, component or step. Likewise, a single element, component or step can be replaced with a plurality of elements, components or steps that serve the same purpose. Moreover, while exemplary embodiments have been shown and described with references to particular embodiments thereof, those of ordinary skill in the art will understand that various substitutions and alterations in form and detail can be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods can include more or fewer steps than those illustrated in the exemplary flowcharts, and that the steps in the exemplary flowcharts can be performed in a different order than the order shown in the illustrative flowcharts.

What is claimed is:

1. In a server environment, a method of facilitating discovery of applications deployed on servers, the method comprising:
    interacting with a user device to facilitate rendering a graphical user interface;
    receiving user input via the graphical user interface identifying enterprise information related to a deployment of an application file within a server environment, the enterprise information including at least one of: an enterprise-specific server location at which the application file resides within the server environment, an entity within the enterprise responsible for maintenance of the application file, or an entity within the enterprise responsible for maintenance of the server on which the application file is executed;
    creating an enterprise-specific application identifier tag file that includes the enterprise information, wherein the enterprise-specific application identifier tag file has a unique filename extension that distinguishes the application identifier tag file from other files that can be generated within the sever environment;
    creating an association between the enterprise-specific application identifier tag file and the application file to facilitate discovery of the application file in the server environment, and to facilitate identification of the enterprise-specific server location at which the application file resides, the entity within the enterprise responsible for maintenance of the application file, or the entity within the enterprise responsible for maintenance of the server on which the application file is executed, the enterprise-specific application identifier tag file being stored in a database associated with the server environment;
    deploying the enterprise-specific application identifier tag file within a server of the server environment contemporaneously with deployment of the application file within the server environment;
    creating an application identifier tag query to search for the enterprise-specific application identifier tag file within the server environment based on the unique filename extension; and
    identifying the enterprise information related to the application file based on the application identifier tag query.

2. The method of claim 1, further comprising creating a soft link between the enterprise-specific application identifier tag file and the application file.

3. The method of claim 1, wherein the enterprise-specific application identifier tag file is an XML-format file.

4. The method of claim 1, wherein the application identifier tag query is generated automatically.

5. The method of claim 1, wherein the application identifier tag query is a filename extension query.

6. The method of claim 1, wherein the application identifier tag query discovers a plurality of enterprise-specific application identifier tag files associated with a plurality of application files from a plurality of vendors, the plurality of application files having disparate, developer-specific identifiers provided by the vendors which are incompatible with each other.

7. The method of claim 1, further comprising creating a query report including a list of enterprise-specific application identifier tag files created by a user.

8. The method of claim 1, further comprising creating a query report including a list of enterprise-specific application identifier tag files relating to a specific support group within the enterprise.

9. A system for facilitating discovery of applications deployed on servers, the system comprising:
    a server of a server environment programmed to:
        interact with a user device to facilitate rendering a graphical user interface;
        receive user input via the graphical user interface identifying enterprise information related to a deployment of an application file within the server environment, the enterprise information including at least one of: an enterprise-specific server location at which the application file resides within the server environment, an entity within the enterprise responsible for maintenance of the application file, or an entity within the enterprise responsible for maintenance of the server on which the application file is executed;
        create an enterprise-specific application identifier tag file that includes the enterprise information, wherein the enterprise-specific application identifier tag file has a unique filename extension that distinguishes the application identifier tag file from other files that can be generated within the sever environment;
        create an association between the enterprise-specific application identifier tag file and the application file to facilitate discovery of the application file within the server environment, and to facilitate identification of the enterprise-specific server location at which the application file resides, the entity within the enterprise responsible for maintenance of the application file, or the entity within the enterprise responsible for maintenance of the server on which the application file is executed, the enterprise-specific application identifier tag file being stored within a database associated with the server environment;
        deploy the enterprise-specific application identifier tag file within a server of the server environment contemporaneously with deployment of the application file within the server environment;
        create an application identifier tag query to search for the enterprise-specific application identifier tag file within the server environment based on the unique filename extension; and
        identify the enterprise information related to the application file based on the application identifier tag query.

10. The system of claim 9, wherein the server is further programmed to create a soft link between the enterprise-specific application identifier tag file and the application file.

11. The system of claim 9, wherein the enterprise-specific application identifier tag file is an XML-format file.

12. The system of claim 9, wherein the application identifier tag query is generated automatically.

13. The system of claim 9, wherein the application identifier tag query is a filename extension query.

14. The system of claim 9, wherein the application identifier tag query discovers a plurality of enterprise-specific application identifier tag files associated with a plurality of application files from a plurality of vendors, the plurality of application files having disparate, developer-specific identifiers provided by the vendors which are incompatible with each other.

15. The system of claim 9, wherein the server is further programmed to create a query report including a list of enterprise-specific application identifier tag files created by a user.

16. The system of claim 9, wherein the server is further programmed to create a query report including a list of enterprise-specific application identifier tag files relating to a specific support group within the enterprise.

17. A non-transitory computer readable medium storing instructions executable by a processing device, wherein execution of the instructions causes the processing device to implement a method of facilitating discovery of applications deployed on servers in a server environment, the method comprising:

interacting with a user device to facilitate rendering a graphical user interface;

receiving user input via the graphical user interface identifying enterprise information related to a deployment of an application file within a server environment, the enterprise information including at least one of: an enterprise-specific server location at which the application file resides within the server environment, an entity within the enterprise responsible for maintenance of the application file, or an entity within the enterprise responsible for maintenance of the server on which the application file is executed;

creating an enterprise-specific application identifier tag file that includes the enterprise information, wherein the enterprise-specific application identifier tag file has a unique filename extension that distinguishes the application identifier tag file from other files that can be generated within the sever environment;

creating an association between the enterprise-specific application identifier tag file and the application file to facilitate discovery of the application file within the server environment, and to facilitate identification of the enterprise-specific server location at which the application file resides, the entity within the enterprise responsible for maintenance of the application file, or the entity within the enterprise responsible for maintenance of the server on which the application file is executed, the enterprise-specific application identifier tag file being stored in a database associated with the server environment;

deploying the enterprise-specific application identifier tag file within a server of the server environment contemporaneously with deployment of the application file within the server environment;

creating an application identifier tag query to search for the enterprise-specific application identifier tag file within the server environment based on the unique filename extension; and identifying the enterprise information related to the application file based on the application identifier tag query.

* * * * *